United States Patent [19]

Matsuoka

[11] Patent Number: 5,040,504
[45] Date of Patent: Aug. 20, 1991

[54] HEAT-INSULATING ENGINE SWIRL CHAMBER

[75] Inventor: Hiroshi Matsuoka, Yamato, Japan

[73] Assignee: Isuzu Motors Limited, Tokyo, Japan

[21] Appl. No.: 593,449

[22] Filed: Oct. 4, 1990

[30] Foreign Application Priority Data

Oct. 31, 1989 [JP] Japan .................................. 1-281916

[51] Int. Cl.$^5$ .............................................. F02B 19/16
[52] U.S. Cl. ..................................... 123/254; 123/263; 123/270
[58] Field of Search ............... 123/254, 255, 270, 271, 123/273, 262, 263

[56] References Cited

U.S. PATENT DOCUMENTS 4,511,612 4/1985 Huther et al. ................. 123/270 X
4,856,472 8/1989 Wakasa et al. ................ 123/271 X

FOREIGN PATENT DOCUMENTS 2804562  9/1979  Fed. Rep. of Germany .
47-21508 10/1972 Japan .
54-48207  4/1979  Japan .
55-44070  3/1980  Japan .
59-46317  3/1984  Japan .
60-69324  5/1985  Japan .

Primary Examiner—Tony M. Argenbright
Attorney, Agent, or Firm—Browdy and Neimark

[57] ABSTRACT

The heat-insulating engine with swirl chambers of this invention comprises thin members made of a monolithic ceramic material for forming the surface portions of swirl chambers communicating with main combustion chambers through communication ports, high rigidity outer wall members made of a monolithic ceramic material for forming the outer peripheral portions, and swirl chamber inner wall members made of a ceramic whisker material and disposed between the thin members and the high rigidity wall members. Therefore, this heat-insulating engine with swirl chambers has high thermal stress assured by the thin members, high mechanical strength secured by the high rigidity wall members and high heat-insulating property attained by the swirl chamber inner wall members. Moreover, since the outer wall members have high rigidity and since the swirl chamber inner wall members can offset the stress of the thin members such as deformation, mechanical stress hardly acts on the thin members, though the terminal stress alone is applied thereto. Accordingly, strength of the thin members can be secured.

11 Claims, 1 Drawing Sheet

HEAT-INSULATING ENGINE SWIRL CHAMBER

BACKGROUND OF THE INVENTION

1. Field of the Invention

This invention relates to a heat-insulating engine with swirl chambers in an internal combustion engine.

2. Description of the Prior Art

In combustion chambers of internal combustion engines in general, a swirl chamber system incurs a greater loss of cooling water than a direct fuel injection system and its fuel cost performance is lower. However, since mixing of a fuel and air is effected twice, once in swirl chambers and another in main combustion chambers, in the swirl chamber system, the mixing state is better than in the direct fuel injection system. Further, generation quantities of NOx and HC are smaller in the swirl chamber system than in the direct fuel injection system and the amounts of smoke and particulates generated are also smaller. In connection with the formation process of soot, soot is more likely to occur when the fuel concentration is higher in a fuel-air mixture or its temperature is lower and as to the formation process of NOx, it is more likely to occur when the fuel concentration is lower in the fuel-air mixture or its temperature is higher. As to the formation process of HC, it is more likely to occur when the fuel concentration is lower in the fuel-air mixture or temperature is lower.

It can be understood from the explanations given above that in the internal combustion engines, the swirl chamber system is more advantageous than the direct fuel injection system in reducing the occurrence of soot, NOx and HC but the problem is yet left unsolved as to how to decrease the loss of cooling water in the swirl chamber system to a level equal to, or lower than, that in the direct fuel injection system. In other words, in order to accomplish the temperature rise during the rich mixture combustion period in the swirl chambers and to restrict the generation quantities of smoke and particulate intermediate products, particularly preferred for the swirl chambers of a Diesel engine is the structure which does not permit heat to radiate from its outer periphery, and in order to minimize the loss of cooling water and to improve the fuel economy, there remain the problems as to how to constitute the swirl chambers when they are constituted in the heat-insulating structure and how to secure the strength of the swirl chambers themselves.

Conventionally, the swirl chamber structure wherein the swirl chambers of an internal combustion engine are made of a ceramic material is disclosed in Japanese Utility Model Laid-Open Nos. 69324/1985, 44070/1980 and 48207/1979 and Japanese Patent Laid-Open Nos. 46317/1984 and 21508/1972, for example.

First of all, in the swirl chamber structure of the engine disclosed in Japanese Utility Model Laid-Open No. 69324/1985, swirl chamber forming members are made of a ceramic material and a metallic layer is formed on the inner wall surface of the swirl chambers of the swirl chamber forming members.

In the swirl chamber type combustion chambers of the Diesel engine disclosed in Japanese Utility Model Laid-Open No. 44070/1980, liners having the same shape as the inner surfaces of the combustion chambers and injection ports are formed along their inner surfaces, or a refractory material is sprayed to form a heat-insulating layer.

The swirl chamber forming members of the internal combustion engine disclosed in Japanese Utility Model Laid-Open No. 48207/1979 are produced by fitting a metallic ring having a compressive stress to the outer periphery of a ceramic material formed in a predetermined shape.

Furthermore, the combustion chamber components of the internal combustion engine disclosed in Japanese Patent Laid-Open No. 46317/1984 uses non-oxide ceramics of silicon type such as silicon nitride ceramics and silicon carbide ceramics as a blank material so that the surface of the non-oxide ceramics is converted to silicon oxide ceramics by high temperature heating and a thin layer of a precious metal catalyst is formed on the surface.

In the combustion chambers of the Diesel engine disclosed in Japanese Patent Laid-Open No. 21508/1972, part or the entire portion of the inner wall of the swirl chambers is made of a heat-insulating material and part or the entire portion of its outer periphery is reinforced by metal hoops.

The swirl chamber structure of the internal combustion engine disclosed in each of the prior art references described above cannot provide the sufficient effect in securing heat insulating property of the swirl chambers themselves. Sufficient heat-resistance and strength cannot be secured, either, against the thermal stress of the surface portion exposed to a combustion gas, and moreover, the prior art structure is not sufficient in securing mechanical strength of the swirl chamber structure. Thus, the prior art structures are not yet free from the serious problems.

In other words, in the structures described above where the swirl chambers are constituted by use of the ceramics described above as the heat-insulating material or as the heat-resistant material, it is extremely difficult to secure strength of the wall surface and to obtain sufficient heat-insulating characteristics. In order to obtain sufficient strength, the wall thickness of the ceramics must be increased, and even when the wall thickness of the ceramics is increased, a sufficient heat-insulating effect cannot be obtained.

SUMMARY OF THE INVENTION

It is a primary object of the present invention to solve the problems described above and to provide a heat-insulating engine with swirl chambers having the construction wherein the surface portions of swirl chambers exposed to a combustion gas are formed by thin members of a monolithic ceramic material having high heat-resistance and high thermal shock resistance so that they have high thermal stress capable of withstanding the high temperature combustion gas; the wall main body for forming the swirl chambers is composed of swirl chamber inner wall members made of a ceramic whisker material having a small thermal conductivity and moreover, the mechanical stress and the thermal stress which the thin member receive are absorbed by the swirl chamber inner wall members positioned outside the thin members so as to secure the strength of the thin members made of the monolithic ceramic material and to prevent degradation of the strength resulting from the decrease of the thickness of the ceramic material; and outer wall members made of a monolithic ceramic material having high rigidity and disposed on the outer periphery of the swirl chamber inner wall members absorb the mechanical strength applied to the thin members and to the swirl chamber inner wall members.

It is another object of the present invention to provide a heat-insulating engine with swirl chambers comprising thin members for constituting the surface portions of swirl chambers communicating with main combustion chambers through communication ports, which thin members are made of a monolithic ceramic material having high heat-resistance and high thermal shock resistance such as monolithic silicon nitride ($Si_3N_4$) and monolithic silicon carbide (SiC); outer wall members for constituting the outer peripheral portions of the swirl chambers, which are made of a monolithic ceramic material having high rigidity such as monolithic silicon nitride ($Si_3N_4$) and silicon carbide (SiC); and swirl chamber inner wall members interposed between the thin members and the outer wall members described above, and made of a ceramic whisker material having high heat-insulating property such as silicon nitride ($Si_3N_4$) whisker, silicon carbide (SiC) whisker, and the like.

It is still another object of the present invention to provide a heat-insulating engine with swirl chambers wherein the thin members described above are the thin film which is formed on the entire surface of the swirl chamber inner wall members exposed to the combustion gas by chemical vapor deposition or physical vapor deposition.

It is still another object of the present invention to provide a heat-insulating engine with swirl chambers which has high heat resistance and high thermal shock resistance and can withstand the high temperature combustion gas because the surface portions of the swirl chambers exposed to combustion gas are made of the thin film or in other words, thin sheet, of a monolithic ceramic material such as monolithic silicon nitride ($Si_3N_4$) and monolithic silicon carbide (SiC); which reduces the thermal capacity by reducing the thickness of the ceramic material of the surface portions of the swirl chambers to reduce the thermal capacity of the inner surface of the swirl chambers, and can improve the follow-up property to the combustion gas temperature and can facilitate the temperature rise within a short period; which can execute immediately mixing between a fuel atomization and air; can therefore clear immediately the combustion in a smoke generation temperature zone determined by a fuel equivalent ratio between the fuel and air and by the combustion temperature; can avoid the combustion in a NOx generation temperature zone because a flame is blown out from the swirl chambers to the main combustion chambers and then from the swirl chambers to the main combustion chambers, whereby the fuel equivalent ratio drops drastically and the temperature drops; and can thus effect combustion in the swirl chambers and the main combustion chambers while avoiding the generation of smoke, HC and NOx.

It is still another object of the present invention to provide a heat-insulating engine with swirl chambers which can constitute the swirl chambers in an extremely high heat-insulating structure because the wall main body for forming the swirl chambers is made of a ceramic whisker material having a low thermal conductivity such as silicon nitride ($Si_3N_4$) whisker and silicon carbide (SiC) whisker; which can moreover absorb the mechanical stress and thermal stress the thin members receive, by the swirl chamber inner wall members disposed on the outer peripheral portions of the thin members; which can secure the strength of the thin members, can prevent the drop of strength resulting from the decrease of the thickness of the ceramic material and can attain a structure highly resistant to the thermal stress because the mechanical stress does not act on the thin members themselves; and which is free from possible breakage of the thin members due to the thermal stress or the like occurring at the time of combustion, can reduce the loss of cooling water and can improve the fuel economy.

It is still another object of the present invention to provide a heat-insulating engine with swirl chambers which causes its outer wall members to accept sufficiently the mechanical stress because the outer wall members made of the monolithic ceramic material having high rigidity such as monolithic silicon nitride ($Si_3N_4$) and monolithic silicon carbide (SiC) are disposed around the outer periphery of the swirl chamber inner wall members described above; whose outer wall members can receive the mechanical stress though the mechanical stress which the thin members and the swirl chamber inner wall members accept acts on the outer wall members as the mechanical stress due to the deformation, or the like, of the swirl chamber inner wall members; which can provide the swirl chambers having extremely high strength because the compressive force acts on the thin members and on the swirl chamber inner wall members as the reaction to the mechanical stress described above and improves the strength of the thin member and swirl chamber inner wall members; whose outer wall members can therefore reinforce the swirl chamber inner wall members, can secure the strength and can prevent the breakage due to mechanical and thermal stresses of the swirl chamber inner wall members; and which can reduce the mechanical stress and the thermal stress applied to the thin members by the swirl chamber inner wall members and can prevent the occurrence of cracks and breakage of the thin members.

It is a further object of the present invention to provide a heat-insulating engine with swirl chambers which bonds firmly the thin members made of the same monolithic ceramic material as the ceramic whisker material of the swirl chamber inner wall members to the swirl chamber inner wall members; which eliminates the problem with strength at each bond portion against the mechanical stress, can seal the swirl chamber inner wall members in the completely seal state and can bond them by forming the thin film at the boundary portions between the outer wall members of the monolithic ceramic material exposed to the combustion gas and the swirl chamber inner wall members by chemical vapor deposition or physical vapor deposition of the same ceramic material, so that even if any gap exists between the outer wall members and the outer surface of the swirl chamber inner wall members, the gap functions as a heat-insulating air layer because it is under the completely sealed state; which can therefore provide an ideal structure for the swirl chambers because the thermal conduction passage to the swirl chambers through the wall surface is cut off by the swirl chamber inner wall members and the heat is not emitted to the outside, thereby improving the heat-insulating effect of the swirl chambers; and which can further reduce the loss of cooling water and can improve fuel economy.

BRIEF DESCRIPTION OF THE DRAWING

The accompanying sole drawing (FIG. 1) is a sectional view showing a heat-insulating engine with swirl chambers in accordance with an embodiment of the present invention.

DESCRIPTION OF THE PREFERRED EMBODIMENT

Figure 1:
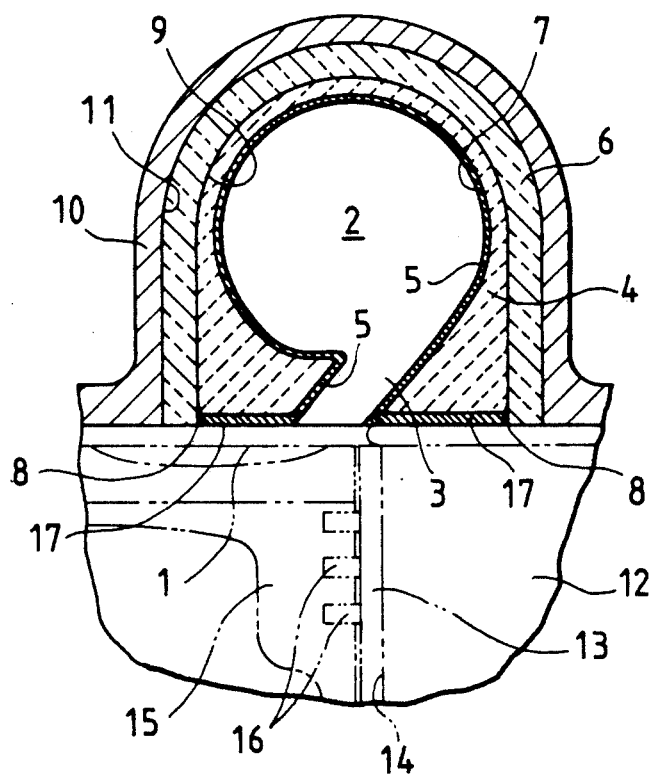

Hereinafter, a preferred embodiment of the heat-insulating engine with swirl chambers in accordance with the present invention will be described in detail with reference to the drawing.

FIG. 1 is a schematic sectional view of the heat-insulating engine with swirl chambers in accordance with an embodiment of the present invention. This heat-insulating engine with swirl chambers comprises mainly swirl chambers 2 communicating with main combustion chambers 1 through communication ports 3, a thin plate 5 as a thin member constituting the surface portion of each swirl chamber and made of a monolithic ceramic material, a swirl chamber inner wall member 4 disposed so as to cover the outer surface of each thin member 5 for heat-insulating each swirl chamber 2 and made of ceramic whiskers and a high rigidity outer wall member 6 disposed on the outer surface of each swirl chamber inner wall member 4 and inside a hole portion 11 of a cylinder head 10 and made of a monolithic ceramic material.

The swirl chamber inner wall member 4 is made of ceramic whiskers such as silicon nitride ($Si_3N_4$) whiskers and silicon carbide (SiC) whiskers, and can secure a high heat-insulating property of each swirl chamber 2.

The thin sheet 5 is made of the same ceramic material as that of the swirl chamber inner wall member 4, that is, a monolithic ceramic material having high heat-resistance, high shock resistance, high deformation resistance, high corrosion and the like, such as monolithic silicon nitride ($Si_3N_4$) and monolithic silicon carbide (SiC). The thin sheet 5 is produced from a thin sheet material having a small thickness and is disposed inside a hole portion 7 as a third hole portion which is formed in the swirl chamber inner wall member 4 in such a manner as to cover the entire inner surface of the swirl chamber inner wall member which is exposed to a combustion gas. Alternatively, the thin sheet 5 is formed by depositing a thin film onto the inner surface 7 of the swirl chamber inner wall member 4 by chemical vapor deposition, physical vapor deposition, or the like, in some cases. In such cases, the thin sheet 5 and the swirl chamber inner wall member 4 can be bonded extremely firmly by use of the equivalent ceramic material.

The outer wall member 6 made of the equivalent ceramic material to that of the swirl chamber inner wall member 4 and having high rigidity and high strength as the monolithic ceramic material such as monolithic silicon nitride ($Si_3N_4$) and monolithic silicon carbide (SiC) is disposed on the outer peripheral surface of the swirl chamber inner wall member 4. The swirl chamber inner wall member 4 is fitted by press-in or like means into the hole portion 9 as the second hole portion which is bored in the high rigidity outer wall member 6. A strong joint portion 8 can be provided between the high rigidity outer wall member 6 and the swirl chamber inner wall member 4 by bonding the boundary portion between the high rigidity outer wall member 6 and the swirl chamber inner wall member 4 by chemical vapor deposition, physical vapor deposition, or the like, by use of the equivalent ceramic material. In this manner, the swirl chamber inner wall member 4 can be fixed into the hole portion 9 of the high rigidity outer wall member 6.

Furthermore, the thin sheet 17 is disposed on the entire surface of the swirl chamber inner wall member 4 exposed to the combustion chamber side and this swirl chamber inner wall member 4 is constituted in a sealed structure. This thin sheet 17 can be formed as a thin film by applying a ceramic material onto the swirl chamber inner wall member 4 by chemical vapor deposition, physical vapor deposition, or the like. Furthermore, a gap may exist between the outer peripheral surface of the swirl chamber inner wall member 4 and the hole portion 9 of the high rigidity outer wall member 6. Since the boundary between the high rigidity outer wall member 6 and the swirl chamber inner wall member 4 which is exposed to the combustion gas is sealed by the joint portion 8, this gap is sealed and functions as a heat-insulating air layer.

The high rigidity outer wall member 6 is assembled into a hole portion 11 as a first hole portion formed in a cylinder head 10 equipped with, or not equipped with, a cooling jacket. The cylinder head 10 is fixed to a cylinder body 12 through a head gasket. A cylinder liner 13 forming a cylinder is fitted into the hole portion 14 of the cylinder body 12 and a piston 15 having fitted therearound a piston ring 16 is disposed inside the cylinder liner 13 in such a manner as to be capable of reciprocating motion.

Though not shown in the drawing, a fuel injection nozzle is disposed in each swirl chamber 2 to inject the fuel. A fitting hole of this fuel injection nozzle is bored in the swirl chamber inner wall member 4 and in the thin sheet 5 of the inner wall surface.

Incidentally, a large thermal shock acts on the inner wall surface of each swirl chamber 2 by the interaction between fuel injection and flame but since the thin sheet 5 made of the ceramic material described above is disposed on the inner wall of each swirl chamber 2, the inner wall surface having high thermal shock resistance can be obtained for the swirl chamber 2. For this reason, even when the swirl chamber inner wall member 4 constituting the swirl chamber 2 is made of the heat-insulating material whose strength is not very high but which has a high heat-insulating property such as ceramic whiskers, it is possible to provide a swirl chamber 2 which has reasonably high strength and at the same time, high heat-insulating property.

What is claimed is:

1. A heat-insulating engine with swirl chambers, including:
   a cylinder block equipped with cylinders;
   a cylinder head fixed to said cylinder block;
   pistons reciprocating inside said cylinders;
   main combustion chambers formed inside said cylinders; and
   swirl chambers communicating with said main combustion chambers and formed inside said cylinder head; comprising:
   first hole portions formed in said cylinder head;
   outerwall members fitted into said first hole portions, constituting the outer peripheral portions of said swirl chambers and made of a high rigidity monolithic ceramic material;
   second hole portions formed in said outer wall members;
   inner wall members disposed inside said second hole portions and made of a heat-insulating ceramic whisker material;
   third hole portions formed in said inner wall members, and communicating with said main combustion chambers through communication paths formed in said inner wall members; and thin members disposed on the surfaces of said inner wall members and made of a heat-insulating monolithic ceramic material; wherein said swirl chambers are formed inside said thin members disposed on the surfaces of said third hole portions, and communication ports for communicating said swirl chambers with said main combustion chambers are formed inside said thin members disposed on the surfaces of said communication paths.

2. A heat-insulating engine with swirl chambers according to claim 1, wherein said thin member is disposed on said inner wall member in such a manner as to cover the entire surface of said inner wall member on the side where it is exposed to combustion gas.

3. A heat-insulating engine with swirl chambers according to claim 1, wherein said ceramic material constituting said thin member is a monolithic silicon nitride material.

4. A heat-insulating engine swirl chambers according to claim 1, wherein said ceramic material constituting said thin member is a monolithic silicon carbide material.

5. A heat-insulating engine with swirl chambers according to claim 1, wherein said ceramic material constituting said outer wall member is a monolithic silicon nitride material.

6. A heat-insulating engine with swirl chambers according to claim 1, wherein said ceramic material constituting said outer wall member is a monolithic silicon carbide material.

7. A heat-insulating engine with swirl chambers according to claim 1, wherein said ceramic material constituting said inner wall member is a silicon nitride whisker material.

8. A heat-insulating engine with swirl chambers according to claim 1, wherein said ceramic material constituting said inner wall member is a silicon carbide whisker material.

9. A heat-insulating engine with swirl chambers according to claim 1, wherein said thin member is a thin film bonded to the surface of said inner wall member by chemical vapor deposition.

10. A heat-insulating engine with swirl chambers according to claim 1, wherein said thin member is a thin film bonded to the surface of said inner wall member by physical vapor deposition.

11. A heat-insulating engine with swirl chambers according to claim 1, wherein said thin member is a thin sheet formed with an extremely small thickness.

* * * * *